US005997894A

United States Patent [19]

Blum et al.

[11] Patent Number: 5,997,894

[45] Date of Patent: Dec. 7, 1999

[54] ANIMAL RESISTANT COATING COMPOSITION AND METHOD OF FORMING SAME

[75] Inventors: Melvin Blum, Wantagh, N.Y.; Michael Roitberg, Highland Park, N.J.

[73] Assignee: Burlington Bio-Medical & Scientific Corp., Farmingdale, N.Y.

[21] Appl. No.: 08/934,049

[22] Filed: Sep. 19, 1997

[51] Int. Cl.$^{6}$ .............................. A01N 25/10; C08J 3/18; C08J 3/20

[52] U.S. Cl. ............................ 424/409; 514/920; 516/32; 516/33; 516/34; 524/28; 524/43; 524/55

[58] Field of Search ............................ 252/309; 424/409; 106/14.25, 14.39, 15.05, 18, 205.5, 205.9; 516/32, 33, 34; 524/55, 28, 43; 514/920

[56] References Cited

U.S. PATENT DOCUMENTS

| | | | |
|---|---|---|---|
| 2,725,321 | 11/1955 | Martello | 524/28 X |
| 3,360,391 | 12/1967 | Richtzenhain et al. | 428/329 |
| 3,428,464 | 2/1969 | Pollard | 106/38.23 |
| 3,756,975 | 9/1973 | Story | 106/14.39 X |
| 3,846,161 | 11/1974 | Marks | 264/430 |
| 3,904,566 | 9/1975 | Cudby | 106/205.9 X |
| 4,171,463 | 10/1979 | Watkins | 174/120 R |
| 4,383,132 | 5/1983 | Bentvelsen et al. | 174/120 SC |
| 4,423,119 | 12/1983 | Brown | 428/558 |
| 4,505,541 | 3/1985 | Considine et al. | 350/96.23 |
| 4,514,035 | 4/1985 | Steinmann et al. | 350/96.23 |
| 4,654,263 | 3/1987 | Cox | 428/366 |
| 4,734,237 | 3/1988 | Fanelli et al. | 264/122 |
| 4,816,182 | 3/1989 | Novich et al. | 252/309 X |
| 4,874,219 | 10/1989 | Arroyo et al. | 350/96.23 |
| 4,938,560 | 7/1990 | Arroyo et al. | 350/96.23 |
| 4,946,237 | 8/1990 | Arroyo et al. | 350/96.23 |
| 5,026,422 | 6/1991 | Osborne | 106/14.25 X |
| 5,139,820 | 8/1992 | Sawada et al. | 427/120 |
| 5,224,967 | 7/1993 | Rolf et al. | 47/58 |
| 5,248,712 | 9/1993 | Takeuchi et al. | 524/55 X |
| 5,269,349 | 12/1993 | Sugier et al. | 138/172 |
| 5,417,887 | 5/1995 | Skeele | 252/309 |
| 5,437,869 | 8/1995 | Kelley | 424/409 X |
| 5,503,771 | 4/1996 | Staley et al. | 252/313.1 |
| 5,567,914 | 10/1996 | Minarovic et al. | 174/93 |
| 5,645,843 | 7/1997 | Cannelongo | 424/409 X |

FOREIGN PATENT DOCUMENTS

| | | | |
|---|---|---|---|
| 0106707 | 4/1984 | European Pat. Off. | 106/14.39 |
| 293 699 | 12/1988 | European Pat. Off. . | |
| 2692586 | 12/1993 | France . | |
| 1415849B | 11/1970 | Germany . | |
| 31 10 008 | 9/1982 | Germany . | |
| 3-196834 | 8/1991 | Japan . | |

OTHER PUBLICATIONS

Poroshk. Metall. (Kiev) 1989 (1), 65–71.

The Condensed Chemical Dictionary, Sixth Edition, Reinhold Publ. Corp., New York (1961), p. 554.

The Meck Index, Tenth Edition, Publ. by Merck & Co., Inc., Rahway, N.J. (1983) p. 9868.

*Primary Examiner*—Richard D. Lovering
*Attorney, Agent, or Firm*—Oliff & Berridge, PLC

[57] ABSTRACT

A flexible coating composition of hard ceramic particles, a binder and a polymer, and a method of making the same is disclosed. The coating composition can withstand an animal attack with pressures≧22,000 psi.

27 Claims, No Drawings

ANIMAL RESISTANT COATING COMPOSITION AND METHOD OF FORMING SAME

BACKGROUND OF THE INVENTION

1. Field of Invention

The present invention is directed to an animal resistant coating composition and a means of forming the same. The coating composition includes ultra-fine hard ceramic particles, a binder and a polymer.

2. Description of Related Art

Animal activities cause several problems in many areas. In particular, rodents wreak havoc by biting through wires and cables, chewing their way into buildings and dwellings, and destroying equipment and personal belongings.

Rodents, such as squirrels, gophers and rats, are considered to be the worst pests because of their considerable jaw and chewing strength. For example, squirrels have a biting power of 22,000 psi (pounds per square inch), while the Colorado pocket gopher has a biting power of 18,000 psi. Therefore, these animals cause significant damage if they bite cables, wires, pipes, or hoses providing services such as phone, television, cable, electricity, water or sewage. In the ocean, sharks attack cables providing some of these services. On land, squirrels and rats damage dwellings and buildings. They chew through roofs, eaves, walls, siding, and foundations to gain access to buildings and dwellings.

Many means of preventing animal attacks on cables, wires, pipes and hoses have been developed. In particular, coatings have been developed that are (1) non-lethal but toxic (U.S. Pat. No. 4,171,463) or unpalatable; (2) abrasive, including particles, fibers or whiskers of metal, glass or like material (U.S. Pat. Nos. 4,505,541, 5,567,914); or (3) extremely hard, having ceramics, metal or like substances in the coating (U.S. Pat. Nos. 3,428,464, 4,423,119, 4,514,035 and DE 1415849B). Further, some cables are protected by jackets or sheaths made with overlapping or interlocking parts (EP 00293699 A1). All references cited herein are incorporated by reference in their entirety.

A combination of the above features may also be present. For example, U.S. Pat. Nos. 4,874,219, 4,938,560 and 4,946,237 to Arroyo et al. disclose an animal-resistant fiber optic cable that is nonmetallic. The cable is enclosed in an all dielectric sheath system comprising a plurality of longitudinally extending preformed segments having embedded glass fibers. The segments provide tensile and compressive strength as well as protection from animals. The embedded fibers additionally provide an abrasive agent to deter animal attack.

Similarly, U.S. Pat. No. 5,269,349 discloses a flexible pipe comprising an aluminum alloy matrix composite material with reinforcement elements such as particles and/or whiskers. Again, the metal provides strength, while the particles provide wear resistance.

However, none of the above coatings are totally successful in deterring animal attack. For example, a non-lethal but toxic or unpalatable substance, or an abrasive agent, only bothers the animal once it has bitten into the cable, wire, pipe or hose. Therefore, the animal is not prevented from doing any damage, but merely deterred from doing further damage. One bite is sometimes enough to break one or more of the critical cables or wires in a bundle, or to puncture or weaken a hose or pipe. Overlapping segments can be worked at their weakest point, for example the joint, by animals until they expose the cables, wires, or the vital innards of pipes or hoses, leaving them open to animal, insect or environmental damage. The overlapping segments, as well as hardened coatings containing ceramics, metals or hard polymers, are usually stiff and heavy, making the cables, wires and hoses awkward to maneuver. Further, such coatings are often prohibitively expensive for widespread use.

Other coatings known in the art may be too soft, oxidizable or environmentally unstable to use effectively on cables, wires and hoses. These coatings generally comprise ceramic, metal or glass particles suspended in a gel, liquid or polymer that can be molded or sintered (U.S. Pat. Nos. 4,734,237, 5,139,820 and 5,503,771, JP 03-196834 and *Poroshk. Metall.* (Kiev) 1989 (1), 65–71). For example, U.S. Pat. No. 5,139,820 discloses a method of forming a ceramic coating involving preparation of an extrudable gel compound comprising a metal-organic compound in a solvent and a thermoplastic polymer or monomer. The gel compound is extruded and treated by sintering, thereby subjecting the compound to high temperatures. The high temperatures weaken the bonds in the underlying polymer matrix, resulting in a fragile and weak material with poor adhesion.

Therefore, there is a need to develop armor-like coatings that can be applied to cables, wires, pipes, hoses and other materials to prevent animal attack. In particular, there is a need to develop a thin, hard, flexible, lightweight coating composition that will withstand biting pressures of 22,000 psi or greater and that will be environmentally stable. Further, there is a need to develop such a coating composition that is non-conductive, oxidation resistant and corrosion resistant.

SUMMARY OF THE INVENTION

Therefore, the present invention provides an animal resistant flexible coating composition and a method of forming the coating composition, wherein the coating composition is non-conductive, environmentally stable and corrosion and oxidation resistant. The coating composition includes ultra-fine hard ceramic particles, a binder and a polymer.

DETAILED DESCRIPTION OF PREFERRED EMBODIMENTS

The present invention comprises a coating composition containing ultra-fine ceramic particles with a hardness of at least 1,000 knoop (indentation hardness on a metal surface), a binder, and a polymer. The coating composition is very hard yet flexible, usually chemically inert and non-conductive, lightweight, and corrosion and oxidation resistant. The coating composition is sufficiently hard to resist animal attack, including that of squirrels with a biting power of 22,000 psi. Further, due to the ultra-fine hard ceramic particle size, the coating composition is homogeneous and substantially smooth.

In embodiments, the ultra-fine hard ceramic particles include, but are not limited to, one or more of the following: Diamond, Cubic Boron Nitride, Boron Carbide, Silicon Carbide, Sapphire (Corundum), Tantalum Carbide, Tungsten Carbide, Niobium Carbide, Titanium Carbide, Zirconium Carbide, Porcelain, Agate, Zirconium Oxide, Tin Oxide, Aluminum Oxide, Cerium Oxide and like substances, with a hardness of at least 1,000 knoop. Thorium Oxide may also be used, but it is slightly radioactive and therefore may affect signal transmission on optical cables or telephone lines. The preferred ceramics are listed in Table 1 below.

TABLE 1

| MATERIAL | HARDNESS (MOHS) | HARDNESS (knoop) |
|---|---|---|
| DIAMOND | 10.0 | 9,000–15,000 |
| CUBIC BORON NITRIDE | 9.8 | 4,700 |
| BORON CARBIDE | 9.6 | 2,800 |
| SILICON CARBIDE | 9.4 | 2,500–2,600 |
| SAPPHIRE (CORUNDUM) | 9.0 | 2,100 |
| TANTALUM CARBIDE | 9.0 | 1,950 |
| TUNGSTEN CARBIDE | 8.5 | 1,300–2,100 |

In embodiments, the ceramic particle size can vary from submicron to about 50 microns in average particle diameter. Larger particles usually do not form a colloidal suspension, which is desired for uniform mixing of the coating composition. The optimum particle size is submicron, or, where submicron is too costly or not available, from about 1–10 microns. Whiskers or fibers of the above ceramic materials may also be used. Whiskers or fibers may exhibit greater dispersability for forming a colloidal suspension than particles of the above ceramics in some instances. Therefore, they may afford more coverage and frequently possess greater hardness than particles, allowing less material to be used.

According to the present invention, only a small quantity of ceramic particles, whiskers or fibers is required to achieve the desired hardness of the coating composition. In embodiments, the amount of ceramic particles, whiskers or fibers added to the coating composition may be from about 0.5–75% by weight of the total coating composition, depending on the desired coating composition, degree of flexibility, tensile strength, weight, elasticity and incurred cost desired. As the amount of particles, fibers or whiskers is increased, the coating becomes less flexible, has less tensile strength, less elasticity, is heavier and costs more to produce. Therefore, it is preferred to keep the amount of ceramic particles, fibers and/or whiskers to a minimum. Preferably, the particles, whiskers or fibers (hereinafter "particles") are present in an amount of from about 0.5–30% by weight of the total coating composition, and more preferably, from about 0.5–5% by weight of the total coating composition.

A colloidal suspension of the ceramic particles may be formed by adding ultra-fine ceramic particles to a binder, wherein the binder is in an amount of from about 1%–20% by weight of the total coating composition. The binder may include gum, including but not limited to, xanthan, arabic, tragacanth, tara, agar, carageenan, guar and karaya; methyl, ethyl or hydroxypropyl cellulose; gelatin; alginates; mixtures thereof; and other like substances. In embodiments, the ultra-fine ceramic particles are mixed with the binder to form a homogeneous colloidal suspension. However, if the particles are fine enough, no binder is necessary because the particles will form a colloidal suspension when mixed with the desired carrier.

The colloidal suspension formed by the combination of the ultra-fine hard ceramic particles with the binder may be added to a carrier, wherein the carrier is in an amount of from about 5–50% by weight of the total coating composition. The carrier may include, but is not limited to, a plasticizer, oil, wax, silicone, epoxy, polyurethane, mixtures thereof, or other like substances. The resultant homogeneous mixture of the colloidal suspension and the carrier is incorporated into a polymer, rubber, or other elastomeric material to form a flexible coating composition, wherein the elastomeric material is in an amount of from about 20–95% by weight of the total coating composition, preferably from about 50–90% by weight of the total coating composition. Polymers such as polyethylenes, polypropylenes, styrenes, polyesters, polyurethanes, polyolefins, acrylics, phenolics, polyvinyl chlorides (PVC's), Teflons, nylons, rubbers, silicones and the like may be used, for example. The coating composition may be used as formed, or further processed by methods known in the art into sheaths for covering fiber optic cables, wires, pipes, hoses or other like substances.

In embodiments, the coating composition may additionally contain a shielding compound in an effective amount including, but not limited to, one or more of Boron Carbide, Zirconium Carbide, Hafnium Carbide, Niobium Carbide, Beryllium Carbide, and other like substances for use in or about nuclear reactors or in fields of intense radiation. Alternatively, a solution containing one or more of these compounds can be applied on top of the coating composition. These substances will prevent polymer breakdown and impart nuclear shielding properties to the coating composition.

Further, aversive agents can be added to the coating composition or coated on after application of the coating composition in an amount of from about 0.001%–0.5% by weight of the total composition to provide a further deterrent to animal attack. Such aversive agents may include, but are not limited to, Denatonium compounds and their derivatives, Capsaicin or capsicum compounds and their derivatives, Lidocaine compounds and their derivatives, Sucrose Octa Acetate, Brucine, like substances and mixtures thereof.

Because the coating composition of the present invention does not comprise metal, it is non-conductive and corrosion and oxidation resistant. Further, the use of ultra-fine hard ceramic particles allows the coating composition to maintain the flexibility of the polymer incorporated therein for ease in handling.

In embodiments, the coating composition may be used to treat cables, wires, pipes and hoses. Further, it may be used to treat areas of buildings or dwellings likely to suffer from animal attack such as roofs, walls, paneling, siding, eaves and foundations by coating the surfaces with paints, varnishes, shellacs, stains, and the like, containing the composition.

Further, the coating composition according to the present invention can be used to treat outdoor furniture, fences, bird houses and bird feeders, screens and other items frequently subject to animal attack. Other uses will be obvious to one of ordinary skill in the art.

The following Examples are provided for illustrative purposes only, and do not in any way limit the scope of the application. Alternative formulations and methods will be obvious to one of ordinary skill in the art. All materials are given in weight percent of the total coating composition unless otherwise specified.

EXAMPLES

Example 1

1% Diamond particles—submicron

20% Oil (Epoxidized Soy)

79% Polyethylene

The submicron particles form a colloidal suspension with the oil, which is then added to the polyethylene. The resultant composition is then formed into a polymeric sheath by methods known in the art.

Example 2

5% Boron Carbide particles—5 micron

10% Xanthan gum

10% Wax

75% Polypropylene

The particles form a colloidal suspension with the gum. The colloidal suspension is mixed with the wax, then added to the polypropylene. The resultant composition is then formed into a polymeric sheath by methods known in the art.

Example 3

10% Tungsten Carbide whiskers

20% Guar gum

5% Dioctyl phthalate

65% Methyl methacrylate

The whiskers form a colloidal suspension with the gum. The colloidal suspension is mixed with the plasticizer, then added to the acrylic. The resultant composition is then formed into a polymeric sheath by methods known in the art.

What is claimed is:

1. A flexible coating composition comprising ultra-fine ceramic particles, a binder that forms a colloidal suspension with said ultra-fine ceramic particles, a film-forming polymer, and an aversive agent, wherein the ultra-fine ceramic particles are selected from the group consisting of diamond, cubic boron nitride, boron carbide, silicon carbide, corundum, tantalum carbide, tungsten carbide, niobium carbide, titanium carbide, zirconium carbide, porcelain, agate, zirconium oxide, tin oxide, aluminum oxide, cerium oxide, thorium oxide, and combinations thereof.

2. The coating composition of claim 1, wherein the coating composition is non-conductive.

3. The coating composition of claim 1, wherein the coating composition is corrosion resistant.

4. The coating composition of claim 1, wherein the coating composition is oxidation resistant.

5. The coating composition of claim 1, wherein the hardness is greater than 1000 knoop.

6. The coating composition of claim 1, wherein the ultra-fine ceramic particles are present in an amount of from about 0.5–75.0% by weight of the total coating composition.

7. The coating composition of claim 1, wherein the coating composition is homogeneous.

8. The coating composition of claim 1, wherein the coating composition is smooth.

9. The coating composition of claim 1, wherein the ultra-fine ceramic particles are selected from the group consisting of particles, whiskers, fibers and a combination thereof.

10. The coating composition of claim 9, wherein the ultra-fine ceramic particles are less than or equal to 50 microns in average diameter.

11. The coating composition of claim 10, wherein the ultra-fine ceramic particles are less than or equal to 1 micron in average diameter.

12. The coating composition of claim 10, wherein the ultra-fine ceramic particles are from about 1–10 microns in average diameter.

13. The coating composition of claim 1, wherein the binder is selected from the group consisting of: xanthan; arabic; tragacanth; tara; agar; carageenan; guar; karaya; methyl, ethyl, or hydroxypropyl cellulose; gelatin; alginates; and mixtures thereof.

14. The coating composition of claim 1, further comprising a carrier.

15. The coating composition of claim 14, wherein the carrier is selected from the group consisting of a plasticizer, oil, wax, and combinations thereof.

16. The coating composition of claim 1, further comprising a shielding compound.

17. The coating composition of claim 16, wherein the shielding compound is selected form the group consisting of Boron Carbide, Zirconium Carbide, Hafnium Carbide, Niobium Carbide, Beryllium Carbide, and combinations thereof.

18. The coating composition of claim 1, wherein the aversive agent is selected from the group consisting of Denatonium compounds, Capsaicin or capsicum compounds, Lidocaine compounds, Sucrose Octa Acetate, Brucine, and combinations thereof.

19. The coating composition of claim 1, wherein said aversive agent is contained in an amount of from about 0.001% to about 0.5% by weight of the composition.

20. A method of forming a flexible coating composition comprising ultra-fine ceramic particles, a binder and a polymer, said process comprising the steps of:

forming a colloidal suspension of ultra-fine ceramic particles with a binder that forms a colloidal suspension with said ultra-fine ceramic particles; and adding the colloidal suspension to a film-forming polymer to form the flexible coating composition.

21. The method of claim 20, further comprising the step of mixing the colloidal suspension with a carrier.

22. The method of claim 21, wherein the carrier is selected from the group consisting of a plasticizer, oil, wax, and combinations thereof.

23. The method of claim 20, wherein the binder is selected from the group consisting of xanthan; arabic; tragacanth; tara; agar; carageenan; guar; karaya; methyl, ethyl or hydroxypropyl cellulose; gelatin; alginates; and mixtures thereof.

24. The method of claim 20, wherein the ultra-fine ceramic particles are selected from the group consisting of diamond, cubic boron nitride, boron carbide, silicon carbide, corundum, tantalum carbide, tungsten carbide, niobium carbide, titanium carbide, zirconium carbide, porcelain, agate, zirconium oxide, tin oxide, aluminum oxide, cerium oxide, thorium oxide, and combinations thereof.

25. The method of claim 20, further comprising mixing an aversive agent into said composition.

26. The method of claim 25, wherein said aversive agent is selected from the group consisting of denatonium compounds, capsaicin compounds, capsicum compounds, lidocaine compounds, sucrose octa acetate, brucine, and mixtures thereof.

27. The method of claim 25, wherein said aversive agent is contained in an amount of from about 0.001% to about 0.5% by weight of the composition.

* * * * *